United States Patent
Ye et al.

(10) Patent No.: US 8,928,608 B2
(45) Date of Patent: Jan. 6, 2015

(54) TOUCH SCREEN, TOUCH SYSTEM AND METHOD FOR POSITIONING A TOUCH OBJECT IN TOUCH SYSTEM

(75) Inventors: Xinlin Ye, Beijing (CN); Jianjun Liu, Beijing (CN); Xinbin Liu, Beijing (CN); Zhenyu Wu, Beijing (CN); Haibing Zhang, Beijing (CN); Yuhui Wang, Beijing (CN); Haidong Hao, Beijing (CN); Haibo Tang, Beijing (CN)

(73) Assignee: Beijing Irtouch Systems Co., Ltd, Beijing (CN)

( * ) Notice: Subject to any disclaimer, the term of this patent is extended or adjusted under 35 U.S.C. 154(b) by 255 days.

(21) Appl. No.: 13/497,337

(22) PCT Filed: Sep. 29, 2010

(86) PCT No.: PCT/CN2010/077464
§ 371 (c)(1),
(2), (4) Date: Mar. 21, 2012

(87) PCT Pub. No.: WO2011/038682
PCT Pub. Date: Apr. 7, 2011

(65) Prior Publication Data
US 2012/0176345 A1    Jul. 12, 2012

(30) Foreign Application Priority Data

Sep. 30, 2009  (CN) .......................... 2009 1 0235244
Sep. 30, 2009  (CN) .......................... 2009 1 0235246

(51) Int. Cl.
G06F 3/041    (2006.01)
G06F 3/042    (2006.01)

(52) U.S. Cl.
CPC .............. *G06F 3/041* (2013.01); *G06F 3/0418* (2013.01); *G06F 3/0428* (2013.01)
USPC .......................................... 345/173; 345/175

(58) Field of Classification Search
CPC ..... G06F 3/0421; G06F 3/0428; G06F 3/042; G06F 2203/04104; G06F 3/044
USPC ..................... 345/173–177; 178/18.01–19.01
See application file for complete search history.

(56) References Cited

U.S. PATENT DOCUMENTS

| | | | |
|---|---|---|---|
| 6,362,468 B1 * | 3/2002 | Murakami et al. ............. | 250/221 |
| 6,495,832 B1 * | 12/2002 | Kirby ........................ | 250/341.7 |
| 6,504,530 B1 * | 1/2003 | Wilson et al. ................ | 345/173 |
| 8,227,742 B2 * | 7/2012 | Drumm ....................... | 250/221 |
| 2001/0002694 A1 * | 6/2001 | Nakazawa et al. ............ | 250/221 |
| 2002/0118461 A1 * | 8/2002 | Seino et al. .................. | 359/627 |

(Continued)

FOREIGN PATENT DOCUMENTS

| | | |
|---|---|---|
| CN | 2824143 | 10/2006 |
| CN | 101320307 | 12/2008 |
| CN | 101354624 | 1/2009 |

*Primary Examiner* — Hong Zhou
(74) *Attorney, Agent, or Firm* — Harness, Dickey & Pierce, P.L.C.

(57) ABSTRACT

A touch screen, a touch system and a method for positioning a touch object in a touch system are disclosed. The touch screen comprises an infrared pair tube array, wherein said infrared pair tube array is disposed on an edge of said touch screen. By introducing the infrared pair tube array, the touch screen of the present invention eliminates invalid touch areas in the existing touch screen and avoids false touch points in multipoint positioning.

21 Claims, 9 Drawing Sheets

(56) References Cited

U.S. PATENT DOCUMENTS

| | | | |
|---|---|---|---|
| 2006/0202974 A1* | 9/2006 | Thielman | 345/175 |
| 2006/0279548 A1* | 12/2006 | Geaghan | 345/173 |
| 2008/0273013 A1* | 11/2008 | Levine et al. | 345/173 |
| 2009/0044989 A1* | 2/2009 | Sato | 178/18.01 |
| 2009/0066662 A1* | 3/2009 | Liu et al. | 345/173 |
| 2009/0295755 A1* | 12/2009 | Chapman et al. | 345/175 |
| 2010/0007631 A1* | 1/2010 | Chang | 345/174 |
| 2010/0045629 A1* | 2/2010 | Newton | 345/173 |

\* cited by examiner

TOUCH SCREEN, TOUCH SYSTEM AND METHOD FOR POSITIONING A TOUCH OBJECT IN TOUCH SYSTEM

TECHNICAL FIELD OF THE INVENTION

The present invention relates to the technical field of photoelectric detection, and particularly to a touch screen, a touch system and a method for positioning a touch object in a touch system.

BACKGROUND OF THE INVENTION

With the development of multimedia information technology, optical technology-based touch screens have been applied more and more widely. FIG. 1 is a schematic structure diagram of an optical touch screen in the prior art. As shown in FIG. 1, the optical touch screen comprises a frame 1100, a touch panel 1200, a retro-reflection strip 1300, two cameras 1400 as image sensors and two light sources 1500. The frame 1100 comprises a first edge 1101, a second edge 1102, a third edge 1103 and a fourth edge 1104. The touch panel 1200 is surrounded by the frame 1100. The retro-reflection strip 1300 is fixed on the second edge 1102, the third edge 1103 and the fourth edge 1104 of the frame 1100. The two cameras 1400 are respectively fixed at the corner between the first edge 1101 and the second edge 1102 and the corner between the first edge 1101 and the fourth edge 1104 of the frame 1100, while the two light sources 1500 are respectively fixed upon the two cameras 1400.

There exist the following defects for the optical touch screen in FIG. 1:

Firstly, there exists an invalid touch area in the vicinity of the common edge (i.e. the edge 1101) between the two corners where the two cameras 1400 are fixed. FIG. 2 is a schematic diagram of the invalid touch area in the touch screen illustrated by FIG. 1. As shown in FIG. 2, when a touch object moves from P1 to P2, although the shift distance is large in horizontal direction, the shift distance of the shade formed by the touch object on the retro-reflection strip 1300 is very small, thus, it is impossible to accurately determine the positions of P1 and P2 according to the position of the shade. Moreover, if there are two touch objects P1 and P2 on the optical touch screen, namely, when a multi-touch occurs, although the distance between the two touch objects P1 and P2 is large on the touch panel, the distance between the shades respectively formed by the two objects on the retro-reflection strip 1300 is quite small, so it is impossible to accurately determine the positions of P1 and P2 according to the positions of the shades either.

Secondly, when two or more touch objects conduct touch operations on the touch screen, false touch points will occur (or called "ghost points"). FIG. 3 shows a schematic diagram of the false touch points on the touch screen illustrated by FIG. 1. As shown in FIG. 3, T1 and T2 are real touch points of two touch objects, however, according to the triangulation method, four touch points T1, T2, G1 and G2 of these two touch objects would be obtained, wherein G1 and G2 are the false touch points. In this case, the real touch positions of the multiple touch objects cannot be determined.

SUMMARY OF THE INVENTION

The present invention is proposed in view of the preceding technical problem, and its objective is to provide a new-type touch screen, a touch system as well as a method for positioning a touch object in a touch system, so that there is no invalid touch area on the touch screen, and the problem of the false touch points can be solved.

According to a first aspect of the present invention, a touch screen is provided, which comprises: an infrared pair tube array, disposed on an edge of said touch screen.

According to a second aspect of the present invention, a touch system is provided, which comprises: the above touch screen; an image processing module connected to image sensors in said touch screen, for processing said image information from said image sensors to determine coordinate values of the centre of an image formed on said image sensors by a shade formed by a touch object on a retro-reflection strip of said touch screen; a signal processing module connected to the infrared pair tube array in said touch screen, for determining number information of infrared pair tubes which do not receive infrared rays in said infrared pair tube array, and determining coordinate information of said touch object at the direction along the edge provided with said infrared pair tube array according to the determined number information of said infrared pair tubes which do not receive infrared rays; and a main controller connected to said image processing module and said signal processing module, for determining touch position of said touch object according to the coordinate values from said image processing module and the coordinate information from said signal processing module.

According to a third aspect of the present invention, a method for positioning a touch object in a touch system is provided, which comprises: acquiring image information of a retro-reflection strip and receiving status information of an infrared pair tube array in a touch screen of said touch system; and determining real position information of said touch object according to the image information of said retro-reflection strip and the receiving status information of said infrared pair tube array.

According to a fourth aspect of the present invention, a touch system is provided, which comprises: a main touch positioning system for positioning a touch object to acquire preliminary position information of said touch object; an infrared pair tube array for determining one-dimensional position information of said touch object; and a processing unit connected to said main touch positioning system and said infrared pair tube array, for determining position information of said touch object according to the preliminary position information of said touch object from said main touch positioning system and the one-dimensional position information of said touch object from said infrared pair tube array.

According to a fifth aspect of the present invention, a method of multipoint positioning in a touch system is provided, which comprises: positioning multiple touch objects by means of a main touch positioning system in said touch system, to acquire preliminary position information of said multiple touch objects; determining one-dimensional position information of said multiple touch objects by means of an infrared pair tube array in said touch system; and determining position information of said multiple touch objects according to said preliminary position information and said one-dimensional position information of said multiple touch objects.

DETAILED DESCRIPTION OF PREFERRED EMBODIMENTS

It is believed that the above and other objectives, features and advantages of the present invention will be more apparent through the following detailed description of the preferred embodiments in combination with the drawings.

In the embodiments of the present invention, the touch screen comprises an infrared pair tube array, wherein the infrared pair tube array is disposed on an edge of the touch screen. In the embodiments of the present invention, the touch screen can be, for example, an electronic white board, a resistive touch screen, a surface capacitive touch screen, a projected capacitive touch screen, an optical touch screen, a surface acoustic wave touch screen, a bending wave touch screen, or the like. But the touch screen does not include an infrared touch screen.

Figure 1:
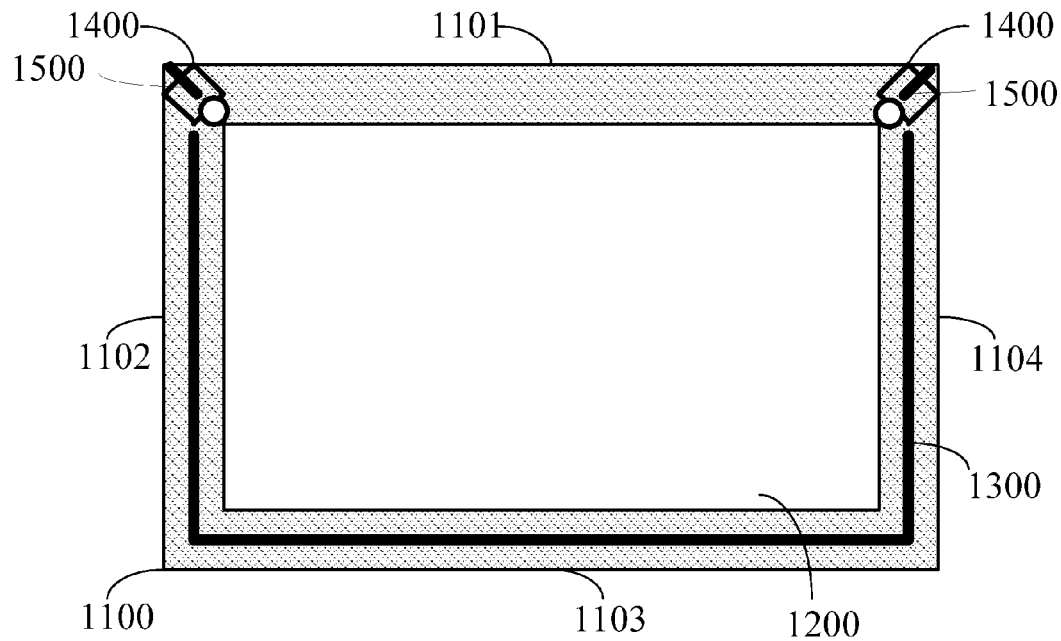
FIG. 1 is a schematic structure diagram of an existing touch screen.
Figure 2:
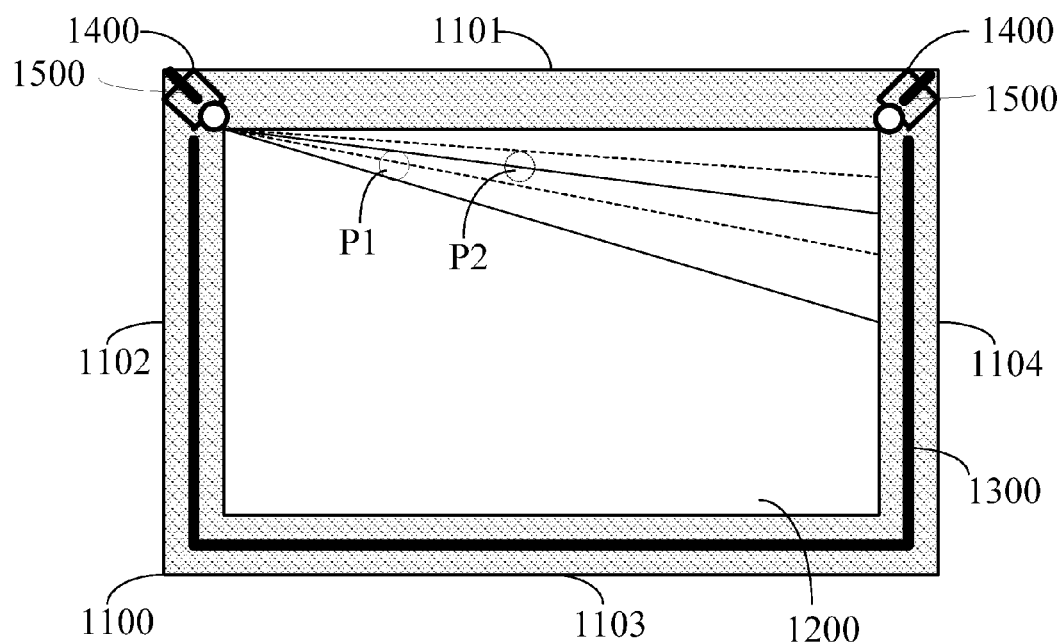
FIG. 2 is a schematic diagram of the invalid touch area in the touch screen illustrated by FIG. 1.
Figure 3:
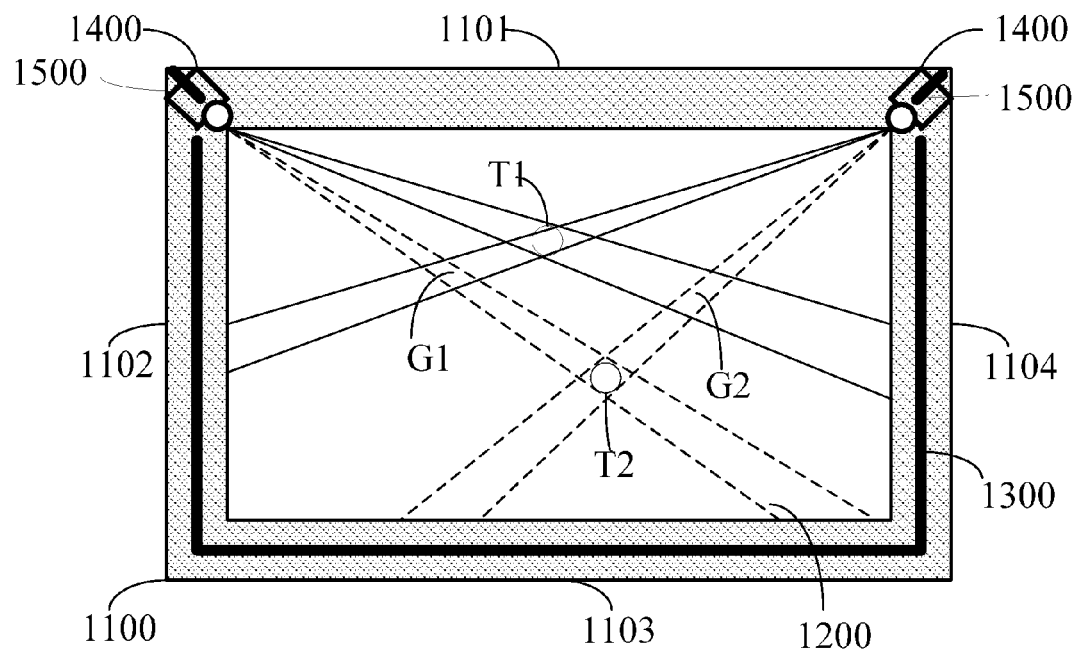
FIG. 3 is a schematic diagram of the false touch points on the touch screen illustrated by FIG. 1.
Figure 4:
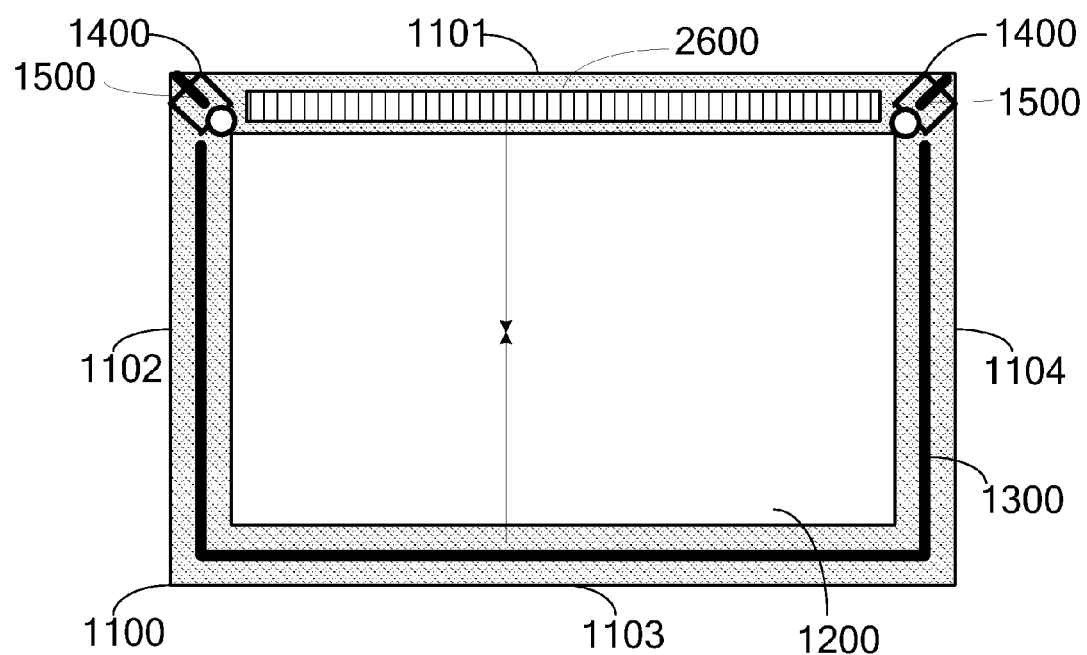
FIG. 4 is a schematic structure diagram of a touch screen according to one embodiment of the present invention.

In the following description, the optical touch screen is taken as an example. FIG. 4 is a schematic structure diagram of the touch screen according to one embodiment of the present invention. This embodiment will be described in detail in conjunction with the figure. As shown in FIG. 4, the optical touch screen comprises: the touch panel 1200, the frame 1100, the retro-reflection strip 1300, two cameras 1400 as the image sensors, two light sources 1500, and an infrared pair tube array 2600. The frame 1100 includes a first edge 1101, a second edge 1102, a third edge 1103 and a fourth edge 1104, and surrounds the touch panel 1200. The retro-reflection strip 1300 is fixed on three edges of the frame 1100, namely, the second edge 1102, the third edge 1103 and the fourth edge 1104. Two cameras 1400 are respectively disposed on the first edge 1101 of the frame 1100, in other words, the two cameras 1400 are respectively disposed at the corners between the first edge 1101 and two adjacent edges (i.e. the second edge 1102 and fourth edge 1104). The two light sources 1500 are respectively fixed in the vicinity of the two cameras 1400, for instance, upon the cameras 1400. The infrared pair tube array 2600 is disposed on the edge of the frame 1100 on which the retro-reflection strip 1300 is not fixed (i.e. the first edge 1101), namely, the infrared pair tube array 2600 is disposed on the same edge of the frame 1100. It can be seen from this embodiment that when the infrared pair tube array is arranged on the same edge of the frame, the retro-reflection strip must be disposed on the edge of the frame opposite to the infrared pair tube array. Alternatively, the infrared pair tube array 2600 may also be disposed on the second edge 1102 or the fourth edge 1104 of the frame 1100.

In another embodiment, the touch screen does not include the frame 1100. In this case, the retro-reflection strip 1300 is arranged on three edges of the touch panel 1200, the two cameras 1400 are respectively fixed at the corners between the edge of the touch panel 1200 on which the retro-reflection strip 1300 is not fixed and two adjacent edges, the two light sources 1500 are respectively fixed in the vicinity of the two cameras 1400, and the arrangement of the infrared pair tube array 2600 is the same as the embodiment illustrated by FIG. 4, for example, the infrared pair tube array 2600 is arranged on the edge of the touch panel 1200 on which the retro-reflection strip 1300 is not fixed.

In the present embodiment, the edge provided with the infrared pair tube array 2600 is the frame 1100 or the edge at the long direction of the touch panel 1200.

Figure 5:
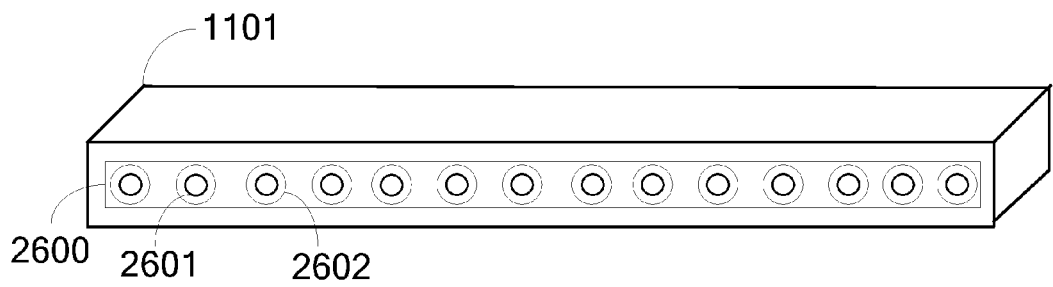
FIG. 5 is an arrangement diagram of the infrared pair tube array in the touch screen illustrated by FIG. 4.
Figure 6:
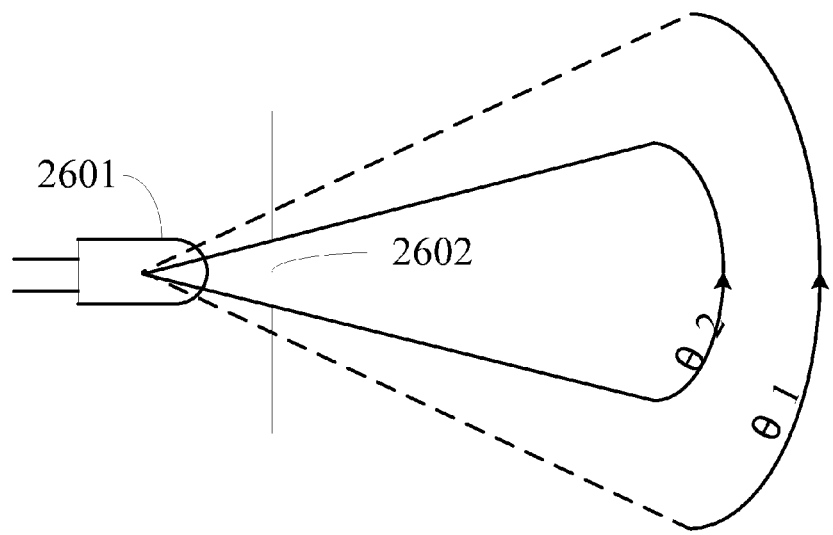
FIG. 6 is a section drawing of an infrared pair tube and a light-limiting hole in the infrared pair tube array.

FIG. 5 is an arrangement diagram of the infrared pair tube array 2600 in the touch screen illustrated by FIG. 4. As shown in FIG. 5, the infrared pair tube array 2600 includes a plurality of completely identical infrared pair tubes 2601, and each infrared pair tube 2601 is evenly disposed inside the first edge 1101 of the frame 1100. A light-limiting hole 2602 is disposed in front of each infrared pair tube 2601, namely, on the front surface of the first edge 1101 of the frame 1100, for limiting the radiation range of each infrared pair tube 2601. FIG. 6 shows a section drawing of the infrared pair tube 2601 and the light-limiting hole 2602. When there is no light-limiting hole 2602, the radiation angle range of the infrared pair tube 2601 is θ1 (shown with the dotted lines). When there is the light-limiting hole 2602, the radiation angle range of the infrared pair tube 2601 is changed to θ2 (shown with the solid lines). The radiation angle range can be adjusted by adjusting the distance between the infrared pair tube 2601 and the light-limiting hole 2602. Furthermore, the use of the light-limiting holes 2602 is capable of reducing interference of the rays reflected by the retro-reflection strip 1300 on the infrared receiving tube in the infrared pair tube 2601.

Figure 7:
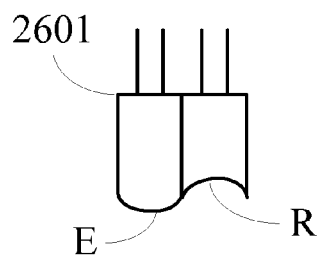
FIG. 7 is a structure diagram of the infrared pair tube.
Figure 8:
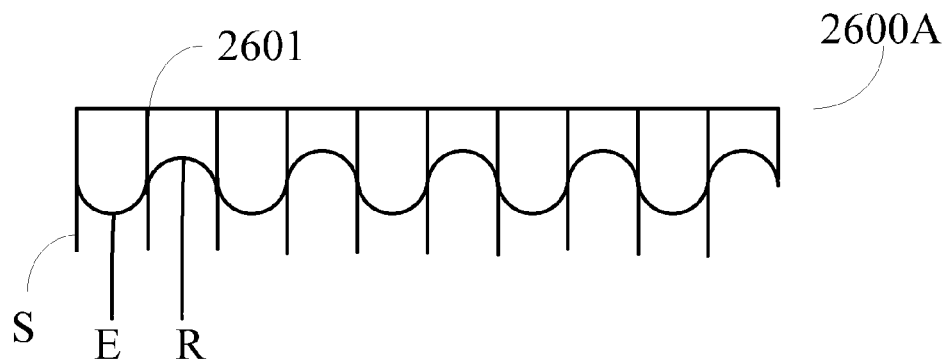
FIG. 8 is a schematic diagram of an arrangement of the infrared pair tubes in the infrared pair tube array.
Figure 9:
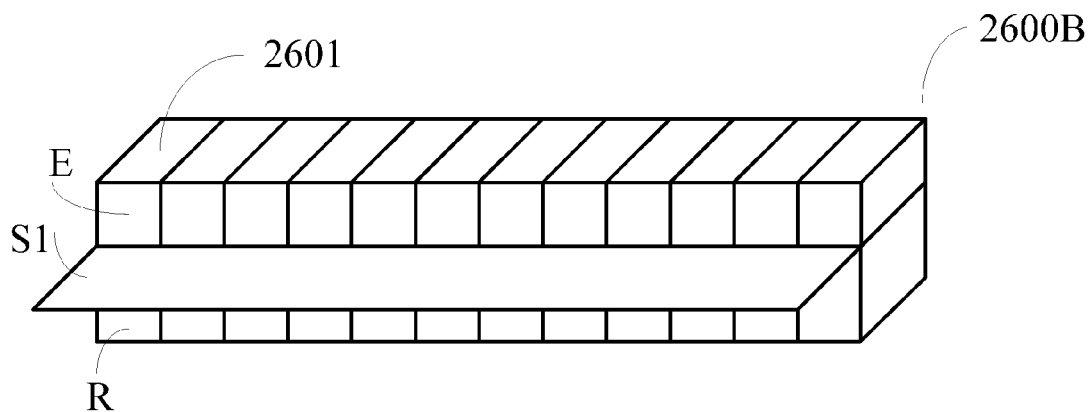
FIG. 9 is a schematic diagram of another arrangement of the infrared pair tubes in the infrared pair tube array.

FIG. 7 is a schematic structure diagram of the infrared pair tube 2601. As shown in FIG. 7, the infrared pair tube 2601 includes an infrared emitting tube E and an infrared receiving tube R. FIGS. 8 and 9 respectively shows two arrangements of the infrared pair tube 2601 in the infrared pair tube array 2600. In the arrangement illustrated by FIG. 8, the infrared emitting tube E and the infrared receiving tube R of each infrared pair tube 2601 are arranged in parallel, and a light shading plate S is disposed at both sides of the infrared emitting tube E of each infrared pair tube 2601. In another arrangement illustrated by FIG. 9, the infrared emitting tube E and the infrared receiving tube R of each infrared pair tube 2601 are arranged to overlap each other, and the light shading plate S1 is disposed between the infrared emitting tube E and the infrared receiving tube R. The setting of the light shading plate S1 can avoid the interference of the infrared rays emitted from the infrared emitting tube E on the infrared receiving tube R.

Figure 10:
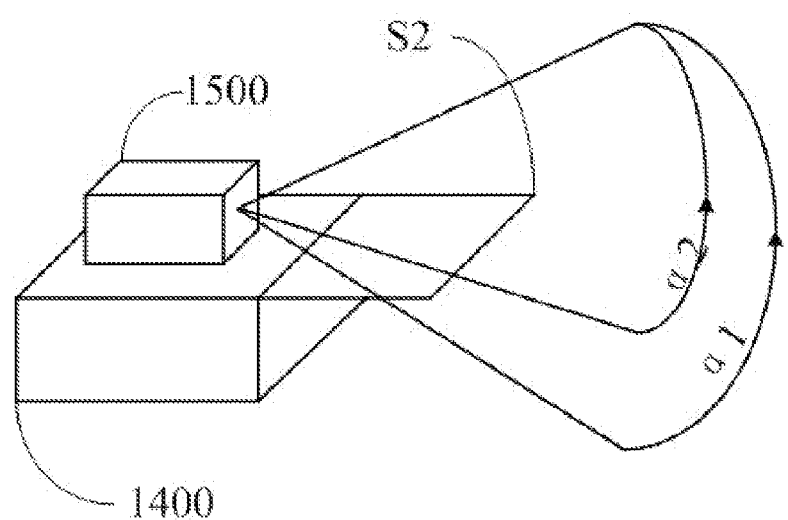
FIG. 10 is an arrangement diagram of a camera and a light source in the touch screen illustrated by FIG. 4.

FIG. 10 is an arrangement diagram of the camera 1400 and the light source 1500 in the touch screen illustrated by FIG. 4. As shown in FIG. 10, the light source 1500 is fixed on the top surface of the camera 1400, and a light shading plate S2 is disposed between the camera 1400 and the light source 1500, which extends along the camera direction of the camera 1400. The light shading plate S2 may be arranged separately, or may be arranged as a whole with the top surface of the camera 1400, or may be arranged as a whole with the lower surface of the light source 1500. By means of the light shading plate S2, the radiation angle range of the light emitted from the light source 1500 can be narrowed from α1 to α2 (shown with solid lines). When the touch object approaches to the camera 1400, since the light shading plate S2 shields the light emitted from the light source 1500 to the vicinity of the camera 1400, the touch object cannot reflect the rays from the light source 1500, and the interference of the reflected rays on the positioning of the camera 1400 would be avoided.

In another embodiment, the retro-reflection strip in the optical touch screen illustrated by FIG. 4 may also be replaced by the light source. In this embodiment, the light source can be arranged on more than one edges of the touch panel or frame. In this case, the infrared pair tube array can be configured to include an infrared emitting tube group and an infrared receiving tube group, respectively disposed on two opposite edges of the touch panel or frame, in other words, the edge of the touch panel or frame where the infrared emitting tube group is located is opposite to the edge of the touch panel or frame where the infrared receiving tube group is located.

Figure 11:
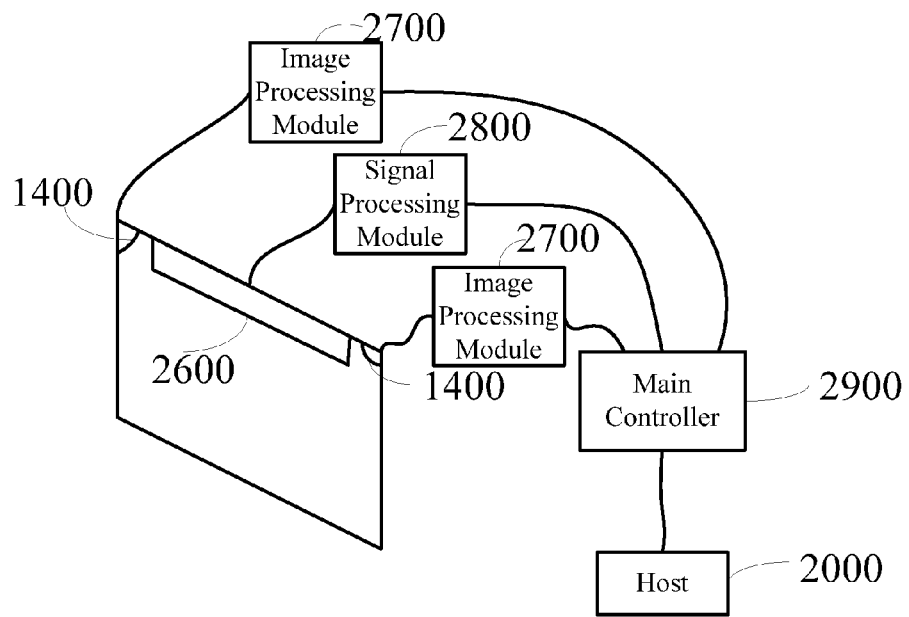
FIG. 11 is a structure diagram of a touch system according to an embodiment of the present invention.

FIG. 11 is a schematic structure diagram of a touch system according to an embodiment of the present invention. The present embodiment will be described in detail in the following paragraphs, in combination with the figure, wherein the same reference signs are used for the same parts as those in the previous embodiments, and the description of these parts is properly omitted.

As shown in FIG. 11, the touch system of this embodiment comprises: the touch screen illustrated by FIG. 4; image processing modules 2700 respectively connected to each camera 1400 of the touch screen; a signal processing module 2800 connected to the infrared pair tube array 2600 of the touch screen; and a main controller 2900 connected to the image processing modules 2700 and the signal processing module 2800. In addition, the main controller 2900 may also be connected to a host 2000.

In the touch system of this embodiment, the image processing module 2700 controls the respective cameras 1400 to collect image information of the touch object on the touch screen, and after the camera 1400 collects a frame of image information, receives and processes the frame of image information to determine the coordinate values of the center of an image formed on a charge-coupled device (CCD) of the camera 1400 formed by the shade formed by the touch object on the retro-reflection strip, and transmits the coordinate information to the main controller 2900. Meanwhile, the signal processing module 2800 determines the number information of the infrared pair tubes which do not receive the infrared rays in the infrared pair tube array 2600, such as the serial number of the infrared pair tube, to determine the coordinate information of the touch object at the direction along the edge provided with the infrared pair tube array, and transmits the coordinate information to the main controller 2900. The main controller 2900 determines the touch position of the touch object according to the coordinate values from the image processing modules 2700 and the coordinate information from the signal processing module 2800. Further, the main controller 2900 transmits the touch position of the touch object to the host 2000 which executes corresponding tasks according to the touch position. The host 2000 could be devices such as personal computer (PC), television, printer, scanner, GPS navigator, mobile phone or the like.

Figure 12:
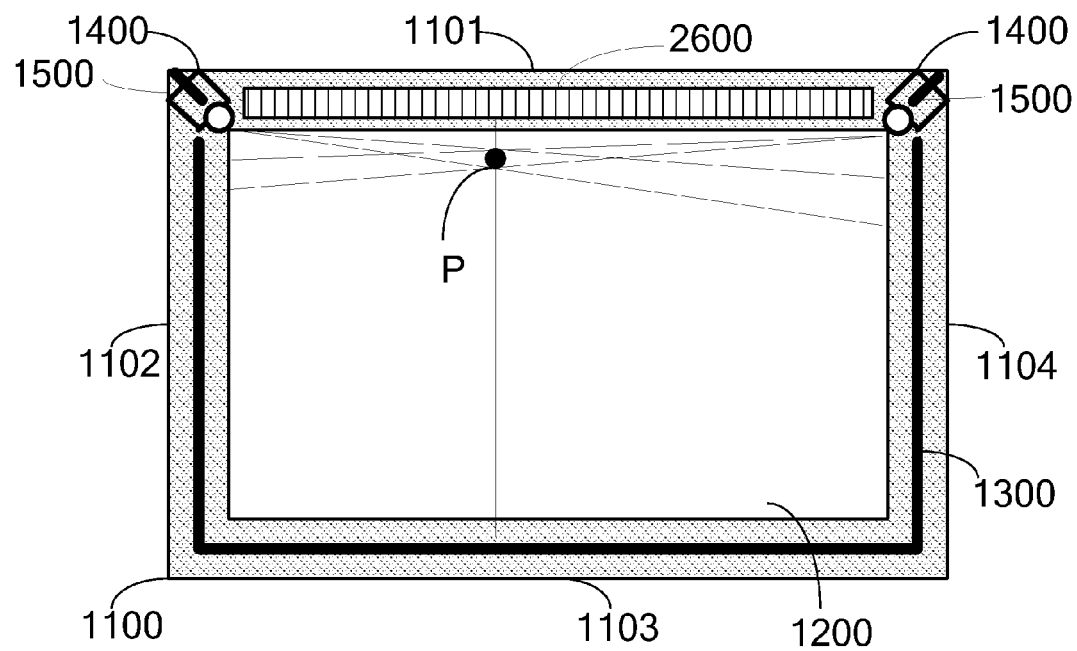
FIG. 12 is a schematic diagram showing the elimination of the invalid touch area in the touch system illustrated by FIG. 11.

FIG. 12 is a schematic diagram showing the elimination of the invalid touch areas in the touch system illustrated by FIG. 11. In the touch system illustrated by FIG. 12, assume that the upper left corner of the touch screen is the origin, the direction along the edge 1101 provided with the infrared pair tube array 2600 is X axis, and the direction along the edge 1102 is Y axis. As shown in FIG. 12, when there is the touch object P near the common edge (i.e. the edge 1101) between the two corners on which the two cameras 1400 are fixed, the touch system determines the horizontal ordinate and vertical ordinate of the touch object P based on the image information collected by the two cameras 1400, determines another horizontal ordinate of the touch object P by means of the infrared pair tube array 2600, and then determine the real horizontal ordinate of the touch object P on the basis of the weighted sum of these two horizontal ordinates, thus the invalid touch areas can be eliminated.

Figure 13:
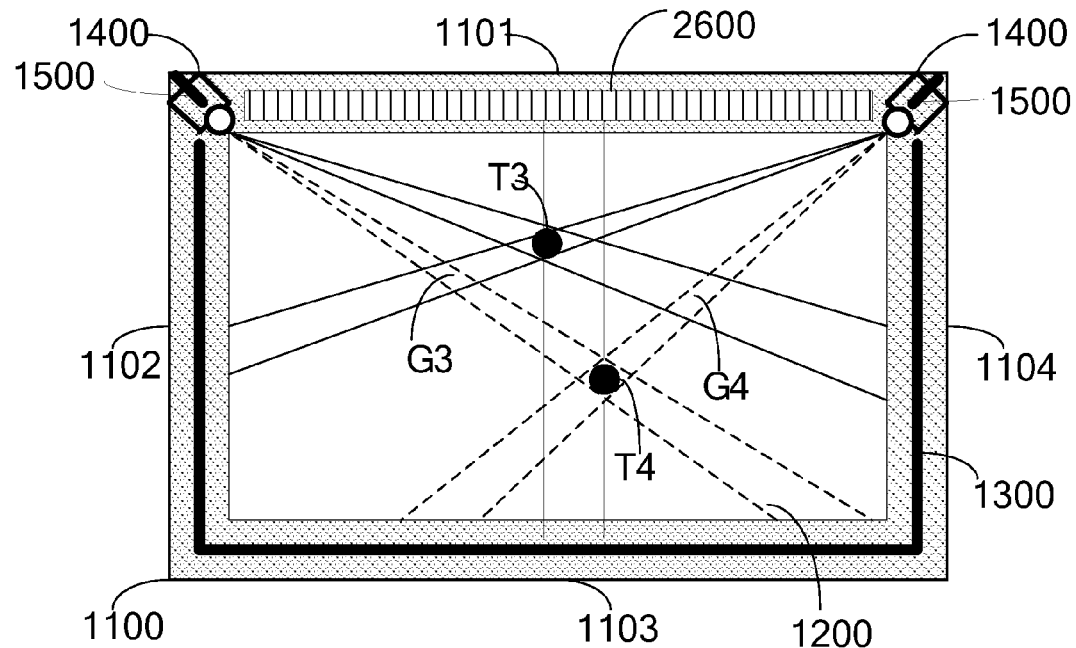
FIG. 13 is a schematic diagram showing the elimination of the false touch points when multiple touch objects conduct touch operations in the touch system illustrated by FIG. 11.

FIG. 13 is a schematic diagram showing the elimination of the false touch points when multiple touch objects conduct touch operations in the touch system illustrated by FIG. 11. Similarly, in the touch system illustrated by FIG. 13, assume that the upper left corner of the touch screen is the origin, the direction along the edge 1101 provided with the infrared pair tube array 2600 is X axis, and the direction along the edge 1102 is Y axis. As shown in FIG. 13, when there are two touch objects T3 and T4 conducting the touch operations on the touch screen, according to the image information collected by the two cameras 1400, the coordinates of four points T3, T4, G3 and G4 are obtained by using the triangulation method. Simultaneously, the horizontal ordinates of T3 and T4 can be determined by means of the infrared pair tube array 2600, and then the two false touch points G3 and G4 can be excluded. Subsequently, based on the acquired two horizontal ordinates of the touch objects T3 and T4, the final horizontal ordinates thereof are determined, and thus the real position coordinates of the touch objects are accurately determined.

It can be seen from the above description that by introducing the infrared pair tube array 2600, the touch screen and the touch system of the above embodiments solve the problems of the valid touch areas and the false touch points in the existing touch screens.

Figure 14:
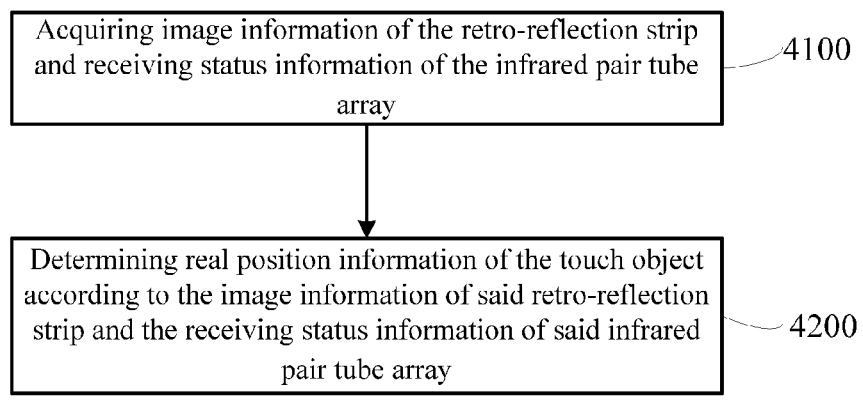
FIG. 14 is a flow chart of a method for positioning a touch object in a touch system according to an embodiment of the present invention.

FIG. 14 is a flow chart of a method for positioning at least one touch object in a touch system according to an embodiment of the present invention. The present embodiment will be described in detail in the following paragraphs in combination with the figure, wherein for the same parts as those of the previous embodiments, their description is omitted properly.

In the present embodiment, the touch system adopts the touch system illustrated by FIG. 11.

As shown in FIG. 14, in step 4100, the image information of the retro-reflection strip 1300 and the receiving status information of the infrared pair tube array 2600 of the touch screen in the touch system are acquired.

When there is the touch object on the touch panel 1200 of the touch screen, since the touch object shields the rays emitted by the light source 1500, a shade area is formed on the retro-reflection strip 1300. The shade area forms a black area after imaging on the CCD of the camera 1400, so the areas without the shade on the retro-reflection strip 1300 form a white background. In the present embodiment, the image information of the retro-reflection strip 1300 is the coordinate values of the centre of the image formed on the two cameras 1400 by the shade formed by the touch object on the retro-reflection strip 1300. Furthermore, since the touch object shields the rays emitted by the infrared emitting tube E of the infrared pair tube 2601 in the infrared pair tube array 2600 which is just opposite to the touch object, or shields the rays reflected by the retro-reflection strip 1300 to the infrared receiving tube R of the infrared pair tube 2601 in the infrared pair tube array 2600 which is just opposite to the touch object, or simultaneously shields the rays emitted by the infrared emitting tube E and the rays reflected by the retro-reflection strip 1300 to the infrared receiving tube R, the receiving tube R of the infrared pair tube 2601 in the infrared pair tube array 2600 cannot receive the rays. In this case, the horizontal ordinate of the touch object can be determined by only recording the numbers of the infrared pair tubes 2601 which do not receive the infrared rays. In this embodiment, the receiving status information of the infrared pair tube array 2600 is the number information of the infrared pair tubes 2601 which do not receive the infrared rays.

Figure 15:
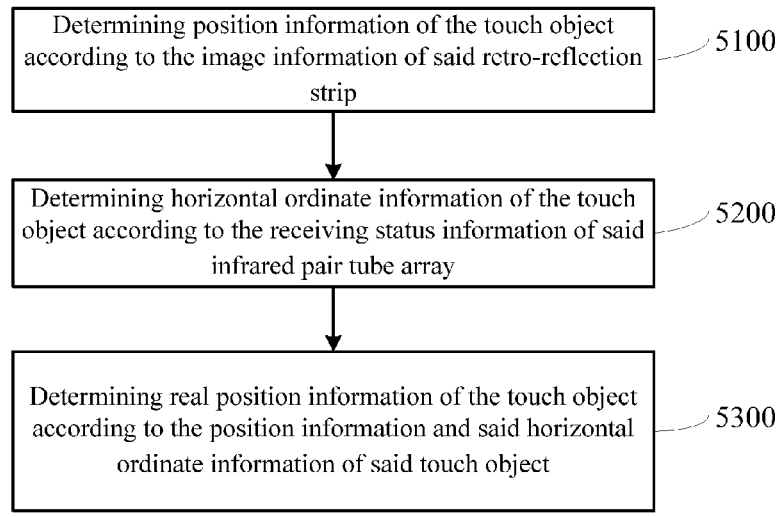
FIG. 15 is a flow chart of the step of determining real position information of the touch object according to the image information of the retro-reflection strip and the receiving status information of the infrared pair tube array in the method shown in FIG. 14.

Then, in step 4200, the real position information of the touch object is determined according to the image information of the retro-reflection strip 1300 and the receiving status information of the infrared pair tube array 2600. FIG. 15 shows a flow chart of the step 4200.

As shown in FIG. 15, in step 5100, the position information of the touch object is determined according to the image information of the retro-reflection strip 1300. This step will be described in detail in combination with FIG. 16.

Figure 16:
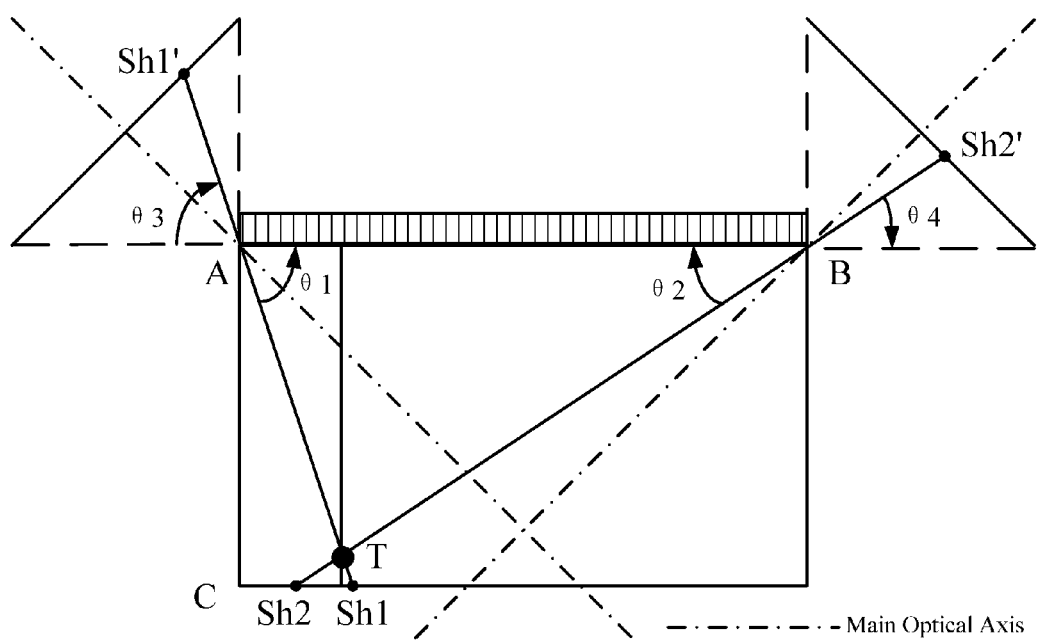
FIG. 16 is a schematic diagram of determining the position information of the touch object according to the image information of the retro-reflection strip in the method illustrated by FIG. 15.

As shown in FIG. 16, assume that the optical centers of the two cameras 1400 are A and B, and the view angles of the two cameras can respective cover the whole touch panel 1200. When there is the touch object T on the touch panel 1200, the touch object T forms two shades on the retro-reflection strip 1300, and the central points of these two shades are Sh1 and Sh2 respectively. The centers of the images formed by the two shades on the CCD of the cameras 1400 are Sh1' and Sh2'. Assume that the angle between line AB and the line connecting the points Sh1 and Sh1' is θ1, and the angle between the extended line of line BA and the line connecting the points Sh2 and Sh2' is θ3, then θ1=θ3. Assume that the angle between line AB and the line connecting the points Sh2 and Sh2' is θ2, and the angle between the extended line of line AB and the line connecting the points Sh2 and Sh2' is θ4, then θ2=θ4. Taking point A as the origin, AB direction as the X axis positive direction, and AC direction as the Y axis positive direction to establish a plane right-angle coordinate system, assuming that the length of AB segment is w, then the coordinates (x, y) of the touch object T is calculated by the following equations:

$$x = (w \tan\theta 2)/(\tan\theta 1 + \tan\theta 2) \quad (1)$$

$$y = (w \tan\theta 1 \tan\theta 2)/(\tan\theta 1 + \tan\theta 2) \quad (2)$$

The calculation of the angles θ1 and θ2 are identical, so as an example, the calculation of θ1 is described here. Assuming the effective usage area of the CCD of the camera 1400 is V*20 pixels, and the pixel value of the point Sh1' is N1, $$\text{let } t = (N1 - 0.5V)/(0.5V), t \in [-1, 1], \quad (3)$$

then θ1 is calculated through the following equation $$\theta 1 = \sum_{i=0}^{m} A_i t^i + 0.25\pi, i = (0, 1, \ldots, m) \quad (4)$$

wherein $A_i$ is a known constant.

In the present embodiment, the value of $A_i$ can be determined by the following calibration method.

Specifically, the touch operation is performed n times in the touch system, wherein m<n, and the pixel value $n_k$ and the corresponding angle $\theta 1_k$ of the point Sh1' in each touch operation are recorded, wherein k=1, 2, 3 ... n, so a number pair ($n_k$, $\theta 1_k$) is generated for each touch operation.

$$\text{Let } t_k = (n_k - 0.5V)/(0.5V), t_k \in [-1, 1], \quad (5)$$

so the number pair ($t_k$, $\theta 1_k$) is obtained, and the calculated value $\theta 1_k'$ of $\theta 1_k$ is calculated according to equitation (4):

$$\theta 1_k' = \sum_{i=0}^{m} A_i t_k^i + 0.25\pi, i = (0, 1, \ldots, m) \quad (6)$$

In order to minimize the error between $\theta 1_k'$ and $\theta 1_k$, let equation (7) have a minimum value:

$$I = \sum_{k=1}^{n} (\theta 1_k' - \theta 1_k)^2 \quad (7)$$

namely, $$I = \sum_{k=1}^{n} \left( \sum_{i=0}^{m} A_i t_k^i + 0.25\pi - \theta 1_k \right)^2 \quad (8)$$

Equation (8) is a multivariable function of $A_1, A_2 \ldots A_m$, and thus the problem is actually a problem of evaluating the extreme value of $I = I(A_1, A_2, L, A_m)$, then $$\frac{\partial I}{\partial A_j} = 2 \sum_{k=1}^{n} \left( \sum_{i=0}^{m} A_i t_k^i + 0.25\pi - \theta 1_k \right) t_k^j = 0, j = 0, 1, \ldots, n \quad (9)$$

namely, $$\sum_{i=0}^{m} \left( \sum_{k=1}^{n} t_k^{i+j} \right) A_i = \sum_{k=1}^{n} (\theta 1_k - 0.25\pi) t_k^j, j = 0, 1, \ldots, n. \quad (10)$$

Equation (10) is linear equations about $A_1, A_2 \ldots A_m$, and the coefficient matrix of the equations is a symmetrical positive definite matrix, so the equations has a unique solution, and the values of $A_1, A_2 \ldots A_m$ can be determined.

Therefore the value of the angle θ1 can be calculated through the pixel value N1 of the image formed on the camera 1400 by the shade formed by the touch object on the retro-reflection strip 1300. Similarly, the value of the angle θ2 can also be obtained. Then, the coordinates (x, y) of the touch object T can be calculated through equations (1) and (2).

After that, in step 5200, according to the receiving status information of the infrared pair tube array 2600, the coordinate information of the touch object at the direction along the edge provided with the infrared pair tube array 2600 is determined, i.e. the horizontal ordinate information.

As stated above, the receiving status information of the infrared pair tube array 2600 is the number information of the infrared pair tubes 2601 which do not receive the infrared rays. Another horizontal ordinate x1 of the touch object T can be determined based on the number information. In the case where multiple touch objects conduct the touch operations, the false touch points of the touch objects can be excluded through the horizontal ordinate.

Subsequently, in step 5300, the real position information of the touch object is determined according to the position information of the touch object determined in step 5100 and another horizontal ordinate of the touch object determined in step 5200. In this embodiment, the final position of the touch object T is determined by the following equations:

$$x_{final} = xr + x1(1-r) \tag{11}$$

$$y_{final} = y \tag{12}$$

that is, the final vertical ordinate of the touch object is the vertical ordinate determined in step 5100, and the final horizontal ordinate of the touch object will be determined based on the horizontal ordinate determined in step 5100 and another horizontal ordinate determined in step 5200.

The "r" stands for a weight value in the equation (11), and is a function about y:

$$r = f(y) \tag{13}$$

and $$\frac{dr}{dy} \geq 0, f(0) = 0,$$

when $$y \geq \frac{w}{2}, f(y) = 1.$$

When $$0 \leq y < \frac{w}{2}, r = f(y) = k_x \arctan\left(\frac{y}{k_y}\right) \tag{14}$$

wherein $k_x$ and $k_y$ are constants.

Further, when $k_x = 1$, $$r = f(y) = \arctan\left(\frac{y}{k_y}\right) \tag{15}$$

Then $$f\left(\frac{w}{2}\right) = 1$$

is substituted into equation (15), $$k_y = \frac{w}{2\tan 1} \tag{16}$$

Thus, $$r = \arctan\left(\frac{2y\tan 1}{w}\right) \tag{17}$$

Figure 17:
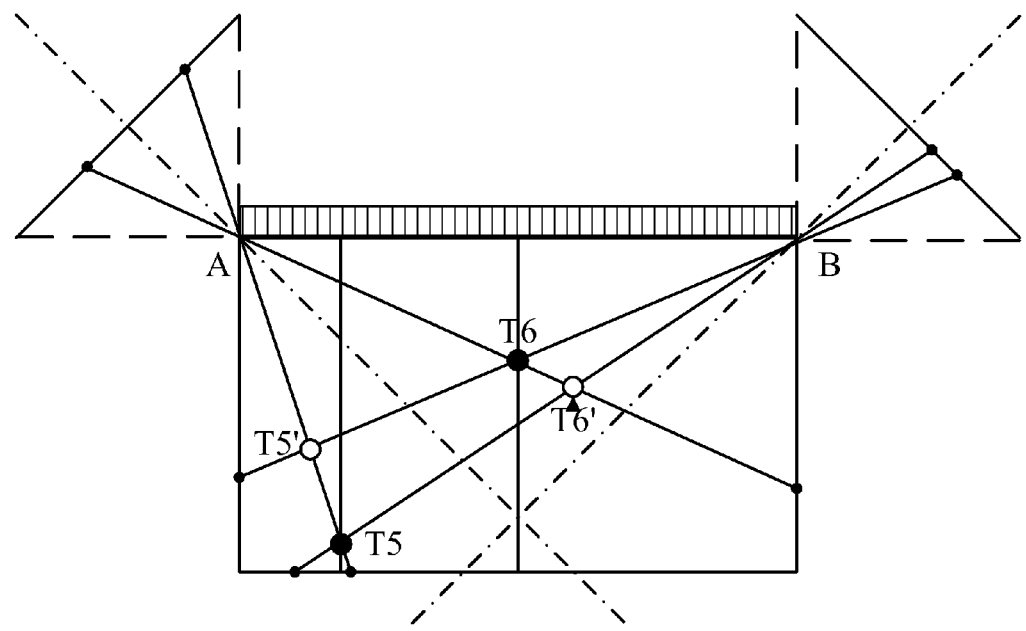
FIG. 17 is a schematic diagram of determining position information of each touch object when multiple touch objects conduct the touch operations by using the method illustrated by FIG. 14.

FIG. 17 is a schematic diagram of determining the position information of each of the multiple touch objects when the multiple touch objects conduct the touch operations by using the method illustrated by FIG. 14. As shown in FIG. 17, when there are two touch objects T5 an T6 conducting the touch operations in the touch panel 1200, first, according to the steps 4100 and 5100, the four position information of the two touch objects T5 and T6, namely, T5, T6, T5' and T6', are obtained by using equations (1) and (2). Then, according to step 5200, another horizontal ordinate of the touch objects T5 and T6 is obtained. Since T5' and T6' are the false touch points that cannot shield the rays emitted by the infrared pair tube array 2600, the false touch points can be excluded by comparing the horizontal ordinates of T5, T6, T5' and T6' with the horizontal ordinates obtained in step 5200. Finally, according to the step 5300, the real position information of each touch object is determined by using equations (11) and (12).

Although the present embodiment is described in an order that step 5100 is performed before step 5200, actually, step 5200 may be performed before step 5100 as well, or the two steps are performed concurrently.

Figure 18:
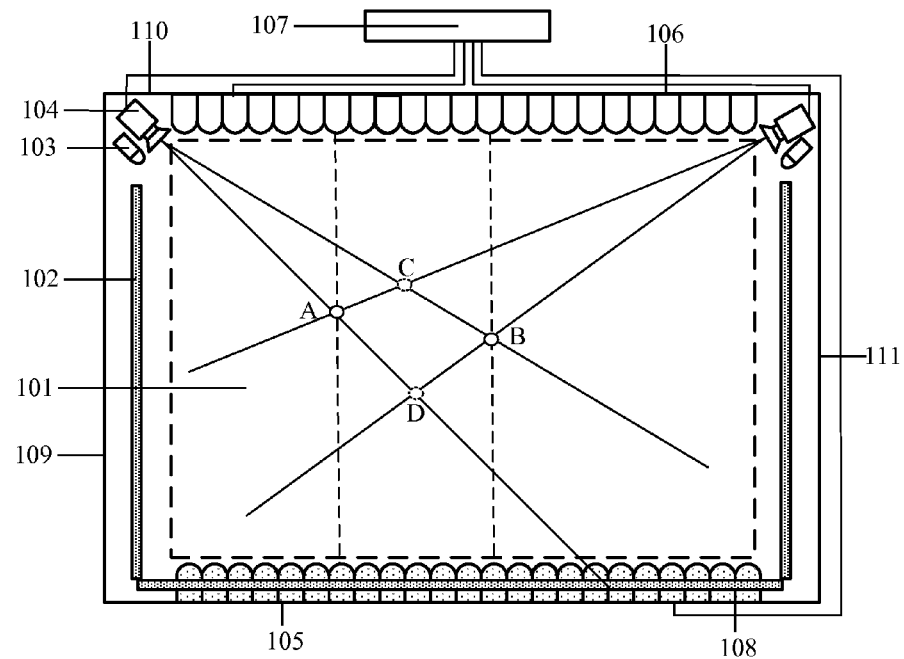
FIG. 18 is a structure diagram of another touch system according to an embodiment of the present invention.

FIG. 18 is a schematic diagram of another touch system according to an embodiment of the present invention. The present embodiment will be described in detail in combination with the figure, wherein for the same parts as those of the previous embodiments, their description is omitted properly.

As shown in FIG. 18, the touch system of the present embodiment comprises: a main touch positioning system for positioning a touch object to acquire preliminary position information of the touch object; an infrared pair tube array for determining one-dimensional position information of the touch object; and a processing unit 107 connected to the main touch positioning system and the infrared pair tube array, for determining position information of the touch object according to the preliminary position information of the touch object from the main touch positioning system and the one-dimensional position information of the touch object from the infrared pair tube array.

In the present embodiment, the main touch positioning system could be, for example, an electronic white board, a resistive touch screen, a surface capacitive touch screen, a projected capacitive touch screen, an optical touch screen, a surface acoustic wave touch screen, a bending wave touch screen, or the like. In the following description, the optical touch screen is taken as an example. As shown in FIG. 18, the optical touch screen comprises the touch panel 101, the retro-reflection strip 102, two light sources 103, two infrared cameras 104 and a processor (not shown). The touch panel 101 has a first edge 110, a second edge 111, a third edge 108 as well as a fourth edge 109. The retro-reflection strip 102 is fixed on three edges of the touch panel 101, for instance, the second edge 111, the third edge 108 and the fourth edge 109, for reflecting the light emitted from the light sources 103 back to the vicinity of the light sources 103, and thereby to provide the infrared cameras 104 with the light necessary for capturing the image information of the touch object. The infrared cameras 104 are respectively disposed at the two adjacent corners of the touch panel 101, for example, the infrared cameras 104 are respectively disposed at the corner between the first edge 110 and the second edge 111 and the corner between the first edge 110 and the fourth edge 109. The light sources 103 are respectively disposed in the vicinity of the two infrared cameras 104, and in the present embodiment, the light sources 103 are the infrared light sources. The processor is used to calculate the preliminary position information of the touch object by using the triangulation method according to the image information from the infrared cameras. Alternatively, the processor may be located in the processing unit 107.

The infrared pair tube array comprises an infrared emitting tube group 105 and an infrared receiving tube group 106, for obtaining one-dimensional position information of the touch object. The infrared emitting tube group 105 and the infrared receiving tube group 106 are respectively disposed on two opposite edges of the touch panel. In FIG. 18, the infrared emitting tube group 105 is mounted on the third edge 108 of the touch panel 101, and the infrared receiving tube group 106 is mounted on the first edge 110 of the touch panel 101. On the third edge 108 of the touch panel 101, the retro-reflection strip 102 is located upon the infrared emitting tube group 105.

The processing unit 107 determines the position information of the touch object according to the preliminary position information and the one-dimensional position information of the touch object. In FIG. 18, the processing unit 107 and the touch panel 101 are disposed separately, but a person skilled in the art will know that they can also be integrated as a whole.

Moreover, the processing unit 107 further includes a control unit for controlling all the infrared emitting tubes in the infrared emitting tube group 105 to illuminate simultaneously.

In addition, the retro-reflection strip 102 may also be replaced by a light source. In this case, the light source can be arranged on more than one edge of the touch panel or frame.

Figure 19:
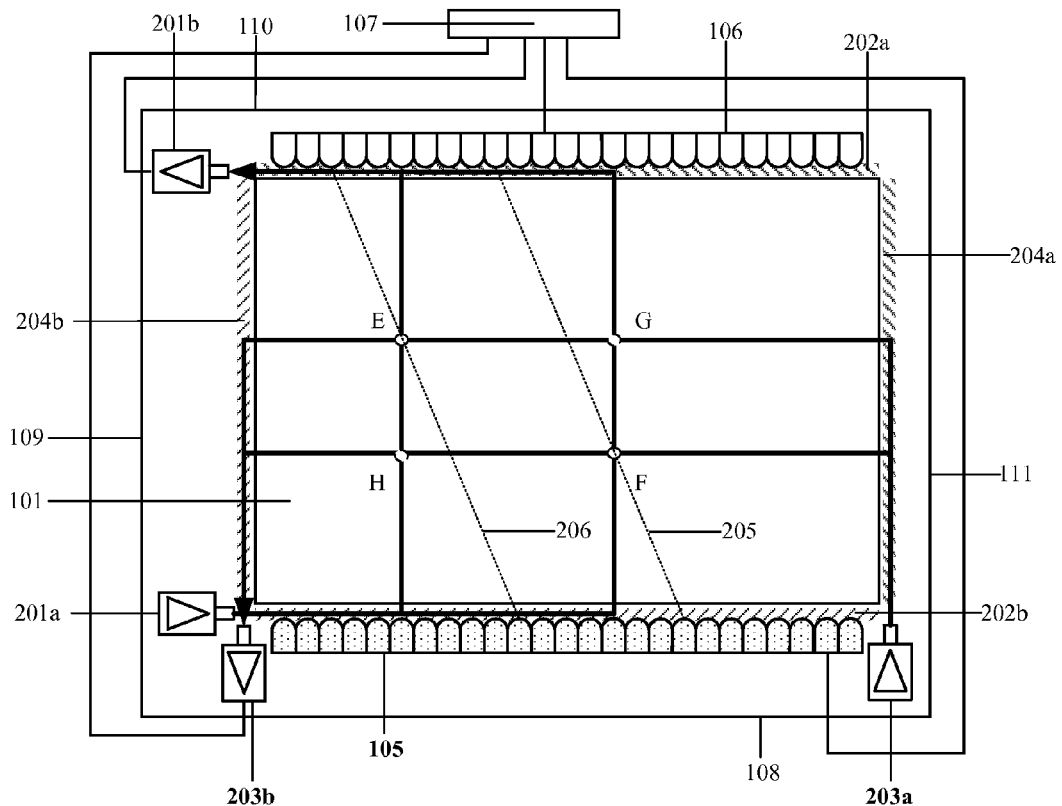
FIG. 19 is a schematic diagram of a variant embodiment of the touch system illustrated by FIG. 18.

FIG. 19 is a schematic diagram of a variant embodiment of the touch system illustrated by FIG. 18. In this variant embodiment, the main touch positioning system is a surface acoustic wave touch screen.

As shown in FIG. 19, the surface acoustic wave touch screen comprises the touch panel 101, two ultrasound transmitting transducer 201a and 203a, two ultrasound receiving transducer 201b and 203b, four reflective arrays 202a, 202b, 204a and 204b, and a processor (not shown). The two ultrasound transmitting transducer 201a and 203a and two ultrasound receiving transducer 201b and 203b are mounted on three corners of the touch panel 101, for example, the corner between the first edge 110 and the fourth edge 109, the corner between the second edge 111 and the third edge 108, and the corner between the third edge 108 and fourth edge 109. The four reflective arrays 202a, 202b, 204a and 204b are respectively mounted on the four edges of the touch panel 101. In this variant embodiment, the reflective arrays 202a, 202b, 204a and 204b as well as the touch panel 101 can all broadcast the sound wave.

The infrared pair tube array comprises the infrared emitting tube group 105 and the infrared receiving tube group 106, wherein the infrared emitting tube group 105 is mounted on the third edge 108 of the touch panel 101, and the infrared receiving tube group 106 is mounted on the first edge 110 of the touch panel 101. On the first edge 110 of the touch panel 101, the infrared receiving tube group 106 is located upon the reflective arrays 202a. On the third edge 108 of the touch panel 101, the infrared emitting tube group 105 is located upon the reflective arrays 202b.

The processor determines the preliminary position information according to the sound wave information received by the receiving transducers 201b and 203b.

The processing unit 107 is connected to the two ultrasound receiving transducer 201b and 203b and the infrared pair tube array, and determines the position information of the touch object according to the preliminary position information and the one-dimensional position information of the touch object.

Figure 20:
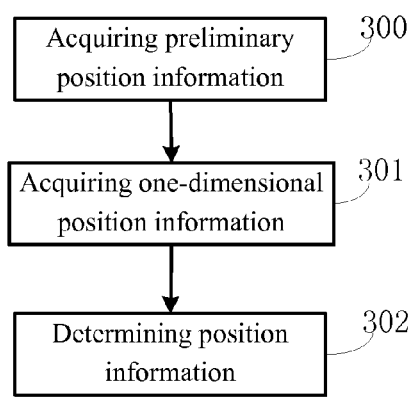
FIG. 20 is a flow chart of a method of multipoint positioning in a touch system according to an embodiment of the present invention.

FIG. 20 is a flow chart of a method of multipoint positioning in a touch system according to an embodiment of the present invention. The present embodiment will be described in detail in combination with the figure, wherein for the same parts as those of the previous embodiments, their description is omitted properly.

As shown in FIG. 20, in step 300, the multiple touch objects are positioned by the main touch positioning system in the touch system to obtain the preliminary position information of the multiple touch objects.

In the present embodiment, the preliminary position information of the touch object could be the coordinate values of the touch object, or other information indicating the position of the touch object.

For instance, in the touch system illustrated by FIG. 18, two touch objects conduct the touch operations. Step 300 is performed to determine the preliminary position information of the touch objects, namely, A (X1, Y1), B (X2, Y2), C (X3, Y3) and D (X4, Y4).

For example, in the touch system illustrated by FIG. 19, if there are two touch objects conducting the touch operations, the preliminary position information of the touch objects obtained by performing step 300 are E (X5, Y5), F (X6, Y6), G (X7, Y7) and H (X8, Y8).

Then in step 301, one-dimensional position information of the multiple touch objects are determined by means of the infrared pair tube array in the touch system.

In the present embodiment, the one-dimensional position information of the touch object is the position information of the touch object in the same direction. The one-dimensional position information of the touch object could be the coordinate information of the touch object, or other information indicating the one-dimensional position information of the touch object. But the one-dimensional position information of the touch object and the preliminary position information of the touch object shall use the same information. If the preliminary position information of the touch object is the coordinates of the touch object, the one-dimensional position information of the touch object will be the horizontal or vertical ordinate of the touch object.

For instance, in the touch system illustrated by FIG. 18, the one-dimensional position information of the touch object obtained by step 301 is X1 and X2 respectively.

For example, in the touch system illustrated by FIG. 19, the one-dimensional position information of the touch object obtained by step 301 is K11 and K21 respectively, wherein K11 is the location where the dotted line 205 is located, and K21 is the location where the dotted line 206 is located.

Next, in step 302, the position information of the multiple touch objects is determined according to the preliminary position information of the multiple touch objects determined in step 300 and the one-dimensional position information of the multiple touch objects determined in step 301.

For instance, in the touch system illustrated by FIG. 18, the preliminary position information of the two touch objects are A (X1, Y1), B (X2, Y2), C (X3, Y3) and D (X4, Y4), while the one-dimensional position information of the two touch objects is X1 and X2. Therefore, the position information of the two touch objects is determined as A (X1, Y1) and B (X2, Y2), while C (X3, Y3) and D (X4, Y4) are the position information of the false touch points.

For example, in the touch system illustrated by FIG. 19, the preliminary position information of the two touch objects is E (X5, Y5), F (X6, Y6), G (X7, Y7) and H (X8, Y8), while the one-dimensional position information of the two touch objects is K11 and K21. Since E (X5, Y5) is on the dotted line 206 and F (X6, Y6) is on the dotted line 205, the position information of the two touch objects is determined as E (X5, Y5) and F (X6, Y6), while G (X7, Y7) and H (X8, Y8) are the position information of the false touch points.

It should be noted that although in the present embodiment, it is described that step 300 is performed before step 301, actually, step 301 may be performed before step 300 as well, or the two steps are performed concurrently.

It can be seen from the above description that the method of the present embodiment determines the position of the touch object by considering the one-dimensional position information acquired by the infrared pair tube array on the basis of the preliminary position information of the touch object, thereby effectively excluding the false touch points.

A person skilled in the art would understand that the above embodiments can be implemented by hardware or by applying software to the universal hardware platform.

Although the preferred embodiments of the present invention have been described in detail in combination with the figures hereinabove, the present invention is not restricted to these embodiments, and a person skilled in the art is allowed to make all kinds of modifications and variations within the sprit and scope of the present invention. The scope of the present invention is merely defined by the appended claims.

The invention claimed is:

1. A touch system, comprising:
   a touch panel;
   a main touch sensing apparatus adapted to sense a position of a touch point on the touch panel by a touch object at different directions and output a first sensed signal; and
   an infrared pair tube array disposed on an edge of the touch panel, adapted to sense the position of the touch point at an extending direction of the infrared pair tube array and output a second sensed signal;
   a first signal processing module connected to the main touch sensing apparatus, adapted to process the first sensed signal from the main touch sensing apparatus to determine preliminary two-dimensional position information of the touch point on the touch panel;
   a second signal processing module connected to the infrared pair tube array, adapted to determine one-dimensional position information of the touch point on the touch panel at the extending direction of the infrared pair tube array according to the second sensed signal; and
   a main controller connected to the first and second signal processing modules, adapted to determine the position of the touch point by using the one-dimensional position information from the second signal processing module and the preliminary two-dimensional position information from the first signal processing module.

2. The touch system according to claim 1, wherein the main touch sensing apparatus is one of a resistive touch sensing apparatus, a surface capacitive touch sensing apparatus, a projected capacitive touch sensing apparatus, an optical touch sensing apparatus utilizing an image sensor, a surface acoustic wave touch sensing apparatus and a bending wave touch sensing apparatus.

3. The touch system according to claim 1, wherein the main touch sensing apparatus comprises:
   two image sensors disposed on an edge of the touch panel, adapted to acquire image information of the touch object on the touch panel; and
   a light source disposed on the edge of the touch panel, adapted to provide light to the two image sensors;
   wherein the infrared pair tube array is disposed on two opposite edges or the same edge of the touch panel.

4. The touch screen according to claim 3, wherein the main touch sensing apparatus further comprises: a frame and a retro-reflection strip, wherein the two image sensors are mounted on two adjacent corners of the frame, each of the light sources is mounted near the respective image sensors; the retro-reflection strip is mounted on three edges of the frame; and the infrared pair tube array is disposed on the same edge or two opposite edges of the frame.

5. The touch system according to claim 4, wherein the infrared pair tube array is disposed on the same edge of the frame, infrared emitting tubes and infrared receiving tubes in the infrared pair tube array are arranged to overlap each other or parallel to each other, and light shading plates are disposed between the infrared emitting tubes and the infrared receiving tubes.

6. The touch system according to claim 4, wherein the infrared pair tube array comprises a plurality of infrared pair tubes, wherein each of the infrared pair tubes includes an infrared emitting tube and an infrared receiving tube adjacent to the infrared emitting tube, and a light-limiting hole is disposed in the front of each of the infrared pair tubes.

7. The touch system according to claim 4, wherein the light source is adjacent to the image sensor, light shading plates are disposed between the image sensors and the light sources, the light shading plates extending along camera direction of the image sensors.

8. The touch system according to claim 4, wherein the two image sensors and the infrared pair tube array are disposed on the edge on which the retro-reflection strip is not mounted.

9. The touch system according to claim 4, wherein the infrared pair tube array comprises an infrared emitting tube group and an infrared receiving tube group, wherein the infrared emitting tube group and the infrared receiving tube group are respectively disposed on the edge on which the retro-reflection strip is not mounted and its opposite edge.

10. The touch system according to claim 1, wherein the second signal processing module determines number information of an infrared receiving tube of the infrared pair tube array which does not receive infrared rays as the one-dimensional position information of the touch point at the extending direction of the infrared pair tube array.

11. A method for positioning a touch point in a touch system, comprising:
   acquiring preliminary two-dimensional position information of the touch point;
   acquiring, by means of an infrared pair tube array, one-dimensional position information of the touch point at an extending direction of the infrared pair tube array; and
   determining the position of the touch point by using one-dimensional position information and the preliminary two-dimensional position information.

12. The method according to claim 11, wherein apparatus for acquiring preliminary two-dimensional position information of the touch point includes two image sensors mounted on two adjacent corners of a touch panel, a light source and a retro-reflection strip; and the step of acquiring two-dimensional position information comprises:
   acquiring coordinate values N1, N2 of a centre of an image formed on the two image sensors by two shades formed by the touch point on the retro-reflection strip;
   according to the coordinate values N1, N2, calculating the values of t1 and t2 corresponding to N1, N2 respectively by using t=(N−0.5V)/(0.5V),t∈[−1,1], wherein V is the total pixel value of any line of a charge-coupled device of each of the two image sensors;

according to the calculated values of t1 and t2, calculating the angles θ1 and θ2 respectively formed by the lines between the center of the two shades and the center of the images formed on the two image sensors and the common edge provided with the two image sensors using $$\theta = \sum_{i=0}^{m} A_i t^i + 0.25\pi,$$

i=(0, 1, . . . , m), wherein m is the highest power of t, and $A_1$, $A_2$ . . . $A_m$ are constants; and according to the calculated angles θ1 and θ2, calculating the position information (x, y) of the touch point by using x=(w tan θ2)/(tan θ1+tan θ2) and y=(w tan θ1 tan θ2)/(tan θ1+tan θ2), wherein w is the length of the common edge.

13. The method according to claim 12, wherein position information of an infrared receiving tube in the infrared pair tube array which does not receive infrared rays is acquired as the one-dimensional position information of the touch point.

14. The method according to claim 12, wherein the one-dimensional position information is horizontal ordinate X1, according to horizontal ordinate x in the two-dimensional position information (x, y) and the horizontal ordinate x1, calculating the horizontal ordinate $x_{final}$ in the real position information of the touch point by using $x_{final}$=xr+x1(1−r), wherein r is a function of y, r=f(y), and $$\frac{dr}{dy} \geq 0,$$

f(0)=0, when $$y \geq \frac{w}{2},$$

f(y)=1; and according to vertical ordinate y in the two-dimensional position information (x, y), using $y_{final}$=y to get $y_{final}$, whereby to get the real position information ($x_{final}$, $y_{final}$) of the touch point.

15. The method according to claim 14, wherein, when $$0 \leq y < \frac{w}{2},$$

$$r = f(y) = k_x \arctan\left(\frac{y}{k_y}\right),$$

wherein $k_x$ and $k_y$ are constants.

16. The method according to claim 15, wherein $k_x$=1.

17. A touch system, comprising:
a main touch positioning system adapted to position a touch point to acquire preliminary two-dimensional position information of the touch point;
one-dimensional position information positioning system including an infrared pair tube array adapted to determine one-dimensional position information of the touch-point; and
a processing unit connected to the main touch positioning system and the one-dimensional position information positioning system, adapted to determine the position of the touch point by using the one-dimensional position information of the touch point from the one-dimensional position information positioning system and the preliminary two-dimensional position information of the touch point from the main touch positioning system.

18. The touch system according to claim 17, wherein the main touch positioning system is one of a resistive touch positioning system, a surface capacitive touch positioning system, a projected capacitive touch positioning system, an optical touch positioning system, a surface acoustic wave touch positioning system and a bending wave touch positioning system.

19. The touch system according to claim 17, wherein the infrared pair tube array comprises an infrared emitting tube group and an infrared receiving tube group, wherein the infrared emitting tube group and the infrared receiving tube group are respectively disposed on two opposite edges of the main touch positioning system.

20. The touch system according to claim 19, wherein the processing unit further include a control unit adapted to control the infrared emitting tubes in the infrared emitting tube group to illuminate simultaneously.

21. The touch system according to claim 17, wherein the one-dimensional position information positioning system determines number information of an infrared receiving tube of the infrared pair tube array which does not receive infrared rays as the one-dimensional position information of the touch point.

* * * * *